United States Patent [19]

Kluver et al.

[11] 4,389,929
[45] Jun. 28, 1983

[54] LATCHING MECHANISM FOR A ROUND BALER

[75] Inventors: Leroy Kluver, Celina; John Arnold, Coldwater, both of Ohio

[73] Assignee: The Paul Revere Corporation, Greenwich, Conn.

[21] Appl. No.: 282,548

[22] Filed: Jul. 13, 1981

[51] Int. Cl.$^3$ ............................................. B30B 5/06
[52] U.S. Cl. ....................................... 100/88; 100/99; 56/341; 292/218
[58] Field of Search ............................. 100/88, 89, 99; 56/10.2, DIG. 15, 341, 342, 343, 344; 292/218, 241

[56] References Cited
U.S. PATENT DOCUMENTS

| | | | |
|---|---|---|---|
| 3,968,633 | 7/1976 | Gaeddert et al. | 56/341 |
| 3,974,632 | 8/1976 | Van Der Lely | 100/88 X |
| 4,009,653 | 3/1977 | Sacht | 100/88 |
| 4,246,743 | 1/1981 | Anstee et al. | 100/99 |

*Primary Examiner*—Peter Feldman
*Attorney, Agent, or Firm*—Robert J. McNair; Abraham Ogman

[57] ABSTRACT

A latching mechanism is described which senses when a bale is ready for discharge from the bale forming chamber. As implemented, the enclosure for the baling chamber was hinged along the front edge to allow the upper portion to open like a rearward facing clam shell for discharge of a completed bale through a tailgate. The latching mechanism holds the opposing tailgate faces of the enclosure together while the bale forming process is being completed. The latching mechanism senses bale density while allowing only a slight opening of the tailgate in response to application of large compressive forces within the baling chamber. The profile of the slot in each latch is uniquely cut so that the forces tending to force open the tailgate can be matched to a spring. The spring is adjustable so as to allow the latch assembly to begin rotation toward the released condition as the bale density reaches a pre-established level. A change in the profile of the latch slot allows it to be displaced enough to sense bale density without allowing it to completely unlatch before the operator desires.

8 Claims, 6 Drawing Figures

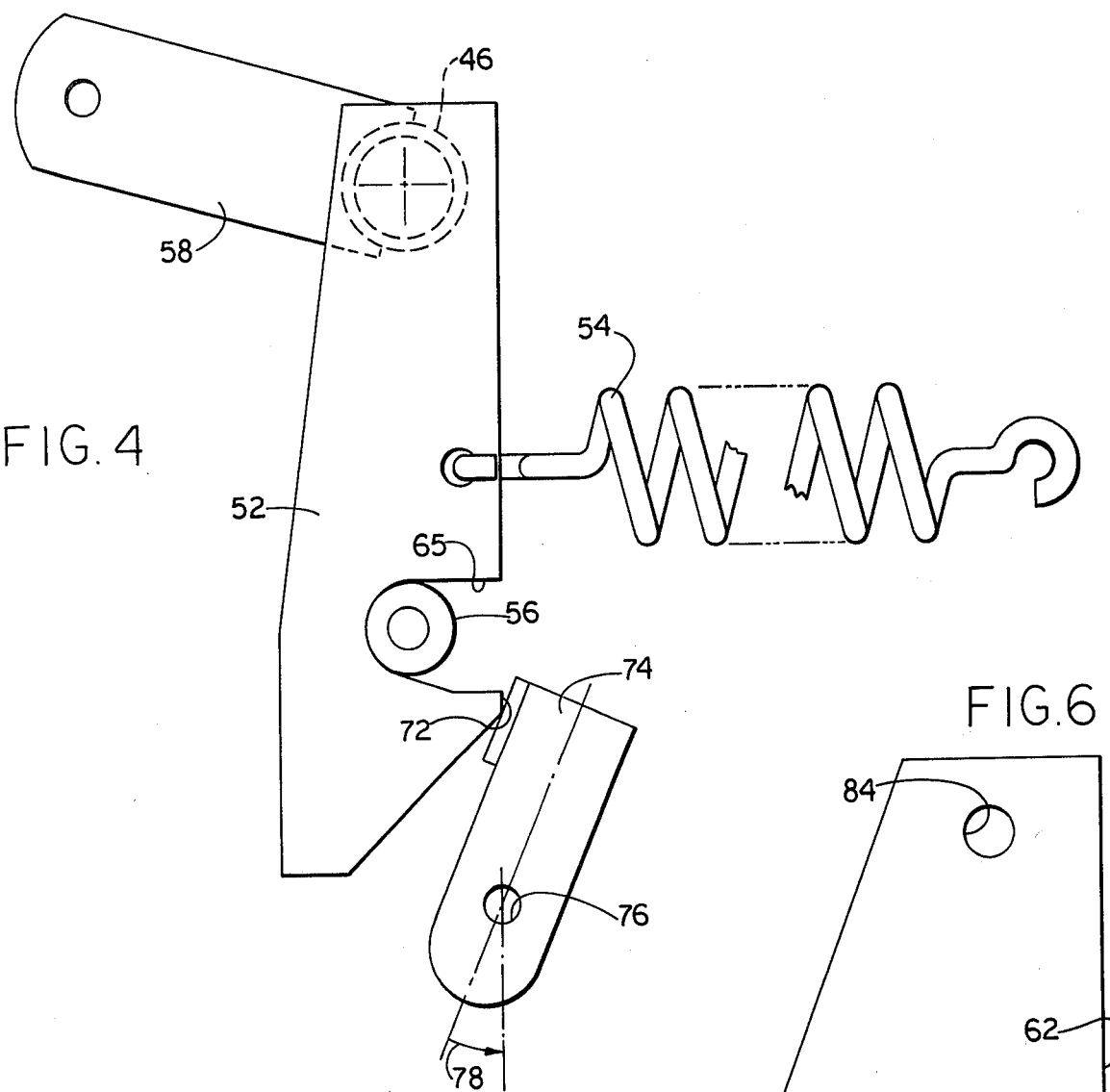
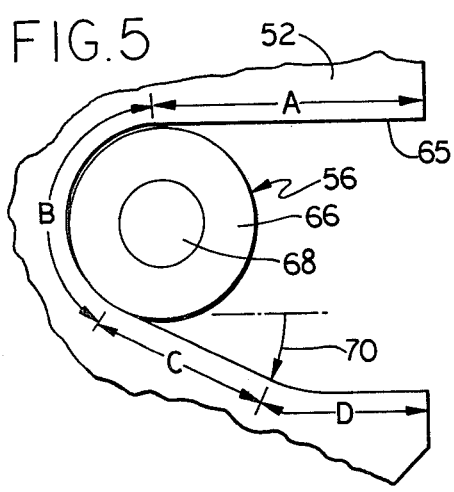

LATCHING MECHANISM FOR A ROUND BALER

BACKGROUND OF THE INVENTION

This invention relates generally to round bale forming machinery and, more particularly, to an improved latching mechanism having means for sensing when the bale is ready for discharge.

An application titled "Pressure Sensing Latch for a Round Baler" having Ser. No. 283,045 and assigned to the same assignee is made copending with this one by simultaneous submission.

Many bale forming machines exist in the art. Some are designed to form bales of cotton; some form bales of paper; others form fibrous agricultural crops into wire or twine tied bales.

The U.S. Pat. No. 4,009,653 to Sacht discloses one method for forming large round bales. The Sacht machine comprises a cage-like frame having a horizontal axis and a generally cylindrical shaped paling zone. Upwardly extending machine sidewalls form the confining end surfaces of the baling zone. A plurality of serially arranged conveying elements enclose and generally define the circumferential periphery of the baling zone. Thus, the size of the baling chamber remains constant during the bale forming process. To accomplish discharge of a completed bale, the baling chamber is divided into two portions approximately along a vertically extending axis cutting plane. The rear portion of the housing is then configured to swing upward from a hinge point at the top, thereby allowing the bale to be discharged rearward.

The U.S. patent application having Ser. No. 162,372, now U.S. Pat. No. 4,319,446, and assigned to the same assignee as this application discloses bale forming means which differ somewhat from the implementation of Sacht. Two additional rollers are added to support the bottom conveyor belts. As viewed from the side the improved system shows four rollers on which a plurality of laterally spaced belts are trained. The second and third rollers (which are respectively in the forward and aft portions of the conveyor midsection) and the fourth roller (which is at the rear of the machine) are disposed to be generally on the cylindrical periphery of the baling zone. The first roller is in front of and somewhat below the plane containing the axis of the third roller. The invention improves on Sacht in two ways. First, the vertical dimension of the entrance throat is enlarged. This allows the baler to operate in a heavier stand of hay without becoming clogged. Second, by lowering the placement of the front roller, a pickup reel of similar diameter can be used. This permits the flow of hay being picked up from the window to pass into the baling zone without undergoing abrupt changes in direction. The laterally spaced conveyor belts accept the crop material being passed on from the pickup reel and frictionally engage the crop strands to provide inward directed pressure to carry them into the baling zone.

U.S. Pat. No. 4,246,743 is representative of signaling means which use a moving take-up means to signal when the bale has reached a predetermined size. Such devices are not sensitive to pressures intitially built up within a bale and then asserted against the walls of the bale cavity.

This invention is shown in conjunction with a baler having a bottom conveyor member for receiving agricultural material which is constructed similar to that disclosed in the U.S. patent application having Ser. No. 162,372. This is done for exemplary purposes only. The latching mechanism will function reliably with any baler having a tailgate on which pressure is applied by a bale.

The latching mechanism provides a simple means of sensing bale density. The profile of the latch-action is matched to the forces tending to open the gate through which a completed bale is discharged.

SUMMARY OF THE INVENTION

It is an object of this invention to provide a latching mechanism which furnishes overload protection for the entire structure by allowing the discharge sequence to start once the bale density reaches a specified limit.

It is another object of the invention to provide a means for signaling when a predetermined pressure is applied by the bale generally on the confining elements and walls defining the bale cavity.

The baler with which the latching mechanism was first reduced to practice forms generally cylindrical bales in a chamber of fixed size. During the bale forming process, the partially completed bale rotates on a horizontal axis while crop material picked up from a window is continuously added to the periphery of the bale. As the baling chamber fills pressure is exerted on the peripheral elements of the enclosure. The enclosure is hinged along the front edge to allow the upper moveable wall member to open like a clam shell for discharge of a completed bale. The latch mechanism holds the opposing faces of the enclosure together until the bale is complete.

Two latches were used, one at each rearward side of the bale forming enclosure. The two latches are joined by a tubular torsional member to insure that they both latch and unlatch the tailgate edges at the same time. This eliminates the possibility of one getting unlatched prematurely causing twisting of the frame members. As implemented, each latch consisted of a generally rectangular piece of flat steel stock having one end secured to the transverse torsional member. Near the second end of each latch was a slot which penetrated the forward facing edge of the metal. The transverse torsional member was rotatably mounted along the rear edge of the baler just above the tailgate opening. The length of the torsional member was such that the latch mechanism on each of its ends was positioned just beyond and adjacent the sidewalls of the baler. The forward facing slots of each latch extended beyond the lower edge of the tailgate opening an amount which was sufficient to allow them to engage pins secured to the frame members of the baler.

The latching mechanism includes a simple means of sensing bale density while at the same time limiting the tailgate opening in response to application of large compressive forces in the baling chamber. The profile of the slot in each latch is uniquely cut so that the forces tending to force open the tailgate can be matched to a spring which serves to oppose rotation of the latch assembly. The spring is adjustable so as to allow the latch assembly to begin rotation toward the released condition as the bale density reaches a pre-established level.

This movement is sensed either mechanically or electrically and displays to the operator when the bale is completely formed. This movement may also be used to activate an automatic twine threader to tie the bale. A change in the profile of the latch slot allows it to be displaced enough to sense bale density without allowing it to completely unlatch before the operator desires. This allows the operator to tie the bale while it is still compressed resulting in a denser bale. Retracting of a hydraulic cylinder will complete the unlatching of the tailgate and will then begin to open it wide to eject the bale.

This method of sensing bale density in a baler with a fixed bale chamber size offers cost and reliability advantages over the prior art hydraulic methods of sensing bale density. Our invention is also not affected by hydraulic leakage.

BRIEF DESCRIPTION OF THE DRAWINGS

FIG. 4 is a side view of the tailgate latching mechanism.

FIG. 5 is an enlarged view of the pressure sensitive portion of the latching mechanism.

FIG. 6 is a side view of the pivot which completes the unlatching of the tailgate.

DESCRIPTION OF THE PREFERRED EMBODIMENT

Figure 1:
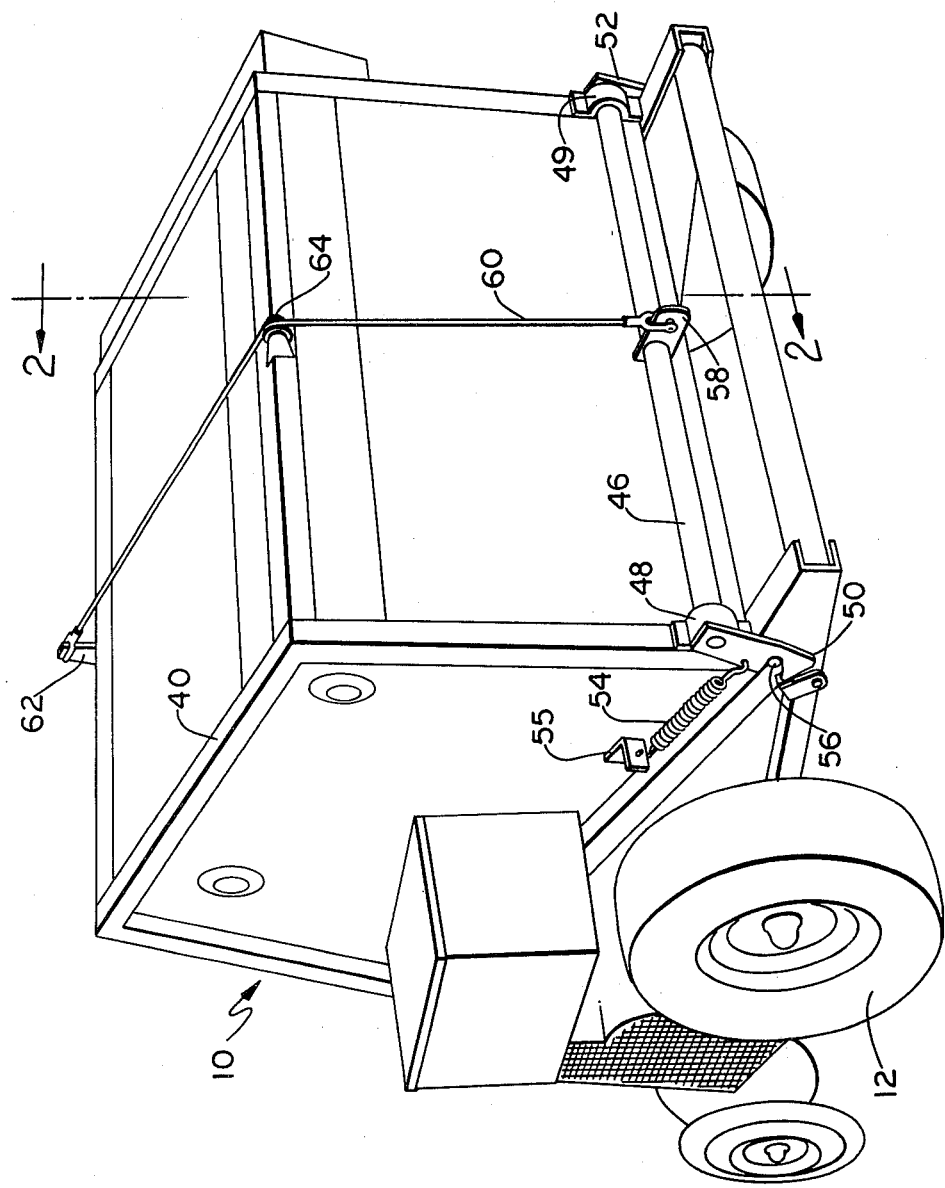
FIG. 1 is an isometric view of a hay baler having the latching mechanism.

FIG. 1 shows a rear view of a baler 10 which is capable of gathering crop material from a windrow and forming it into round bales generally cylindrical in shape. Baler 10 is supported by a pair of wheels 12. The baler is intended to be drawn behind a tractor and to be powered therefrom by means of a power-take-off. The manner in which the baler operates is better seen by reference to FIGS. 2 and 3. Baler 10 having wheels 12 is drawn behind a tractor by hitch 14. When appropriately drawn behind a tractor, astride a windrow of crop material 16, the baler gathers up the crop by means of pickup reel 18.

Pickup reel 18 delivers the crop material to a conveyor which forms the bottom of the baling zone. The conveyor comprises a plurality of side by side belts 20 which are carried over transversely extending rollers 22, 24, 26 and 28. In the unit reduced to practice 5 belts 20 were used to span a baling chamber 5 feet long. Rollers 24, 26 and 28 are generally on the periphery of the cylindrical shaped baling zone. Roller 22 is mounted lower than roller 24. This is done so that a line drawn tangent from the top of pickup reel 18 to the top of roller 24 passes tangentially over roller 22. This helps in the delivery of crop material to the baling zone.

Figure 2:
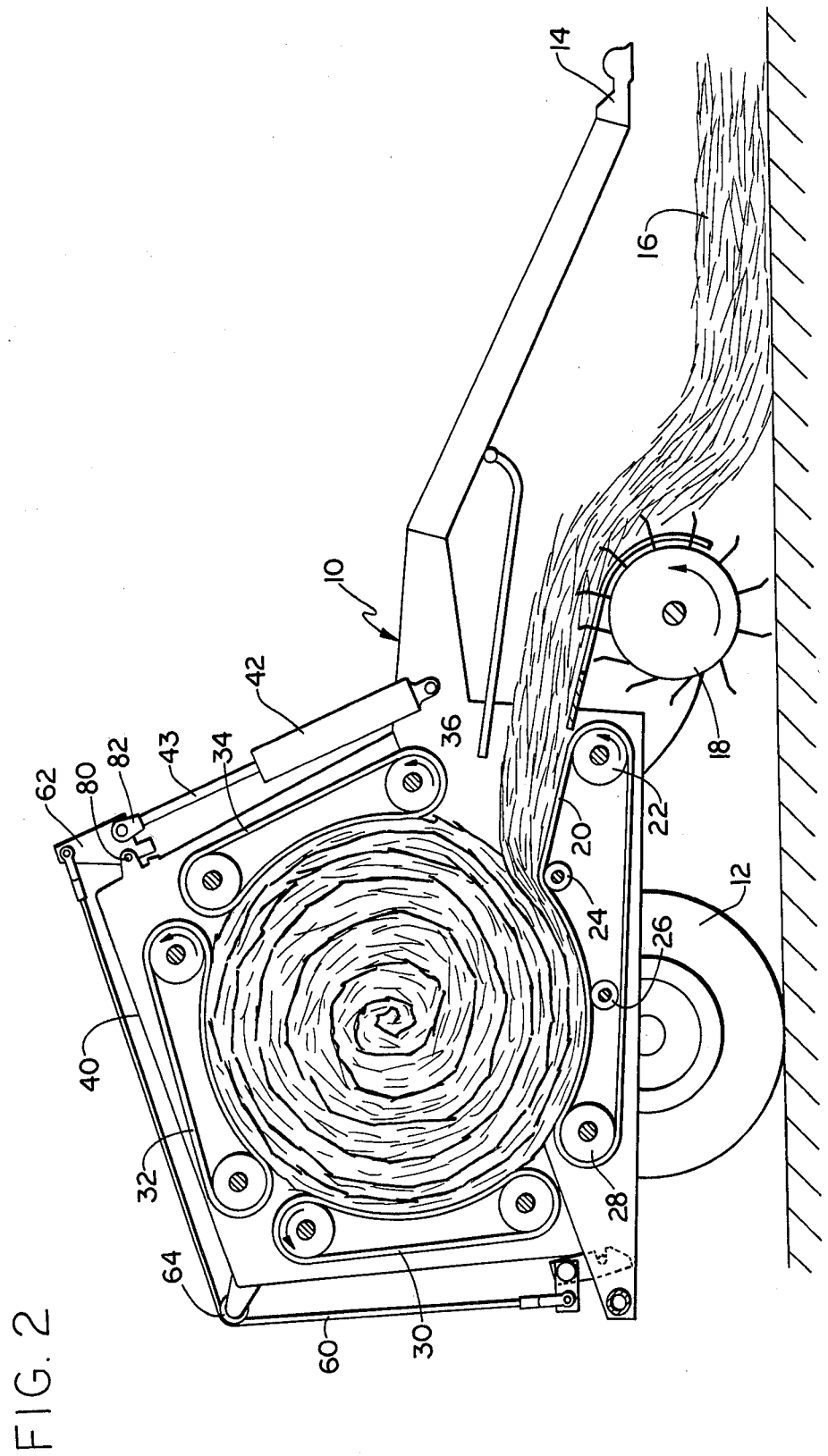
FIG. 2 is a cutaway view of the baler taken along line 2—2 of FIG. 1.
Figure 3:
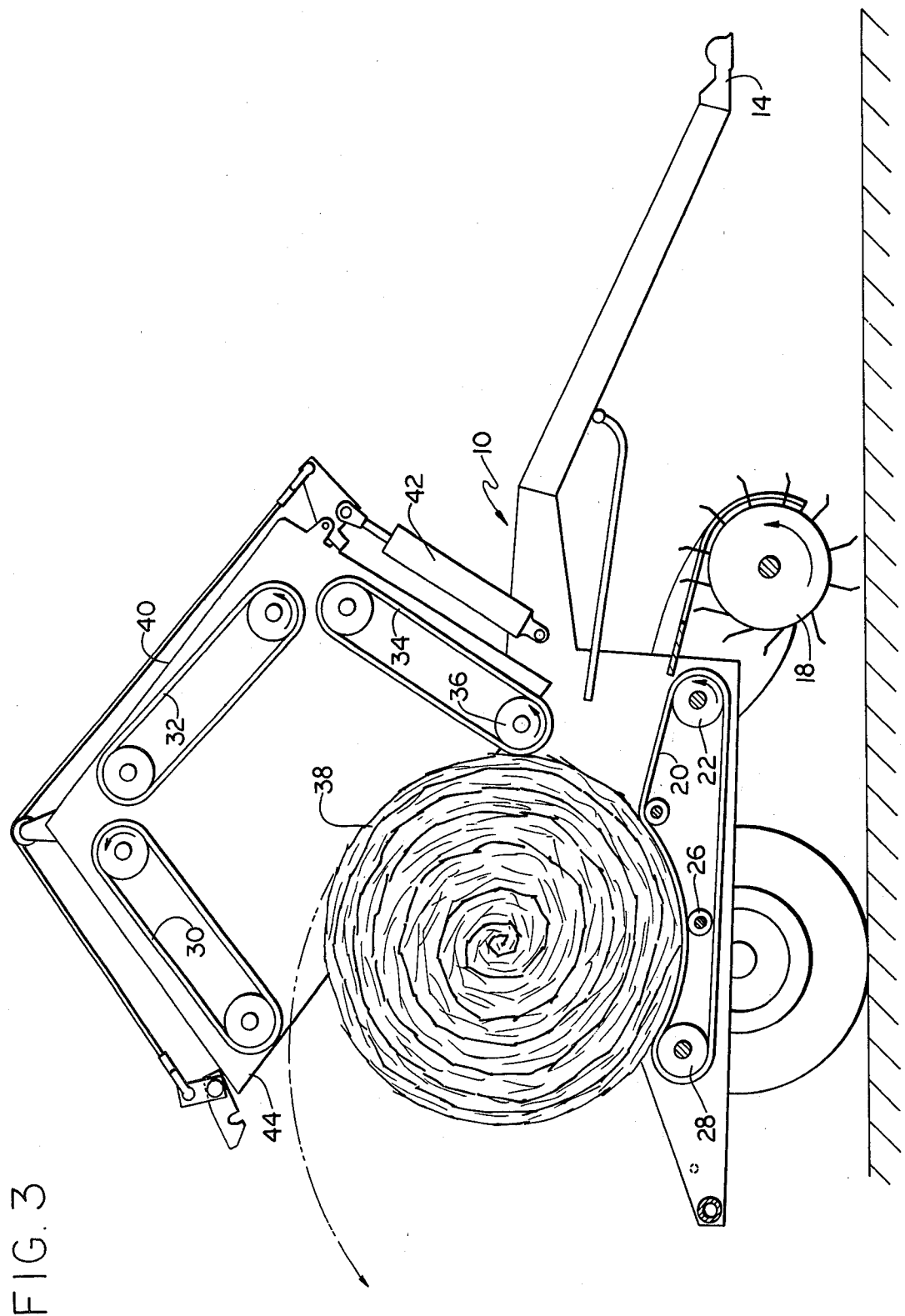
FIG. 3 is a cutaway view of the baler showing the tailgate opened for bale discharge.

Above the bottom conveyor is a series of independent conveyor assemblies which generally surround the cylindrical baling zone. Three such conveyor assemblies are shown in FIGS. 2 and 3. Each of the serially arranged conveyor assemblies 30, 32 and 34 consist of an upstream and a downstream roller over which is entrained a multiplicity of side-by-side belts. All rollers are journalled for rotation in the sidewalls of the machine. The central shaft of each downstream roller extends through the sidewall on the right side of the machine. Sprocket gears on the extended shafts allow all conveyor assemblies to be driven counterclockwise as viewed in FIG. 2. The subframe on which the upper conveyor assemblies are mounted so as to pivot around the shaft of downstream roller 36 is shown in FIG. 3 wherein baler 10 is positioned ready to discharge completed bale 38. Subframe 40 is caused to pivot around the shaft of roller 36 by the action of hydraulic piston 42. When piston 42 retracts, the tailgate end 44 rises sufficiently to allow the completed bale 38 to be discharged out the rear of the baler.

Our invention pertains to the latching mechanism which keeps the tailgate closed when the baler is in the configuration shown in FIGS. 1 and 2. As shown in FIG. 1, the latch assembly comprises a transversely extending torque tube 46 rotatably mounted in bearing plates 48 and 49. On the left end of torque tube 46 is a first member in the form of latch plate 50. On the right end is a second like latch plate 52. There is a spring 54 having one end attached to latch plate 50 and its second end anchored to a bracket 55 that is secured to subframe 40. Spring 54 holds latch plate 50 against a second latch member in the form of pin 56 which is anchored to the baler frame. A slot formed in latch plate 50 allows the latch plate to lock the tailgate in the closed position. Latch plate 52 also has a similar slot which operates in conjunction with another pin extending from the far side of the baler frame. There is also a second spring 54 on the right side of the baler.

A crankarm 58 extends rearward from torque tube 46. A clevis arrangement secures one end of cable 60 to the outer end of crankarm 58. The second end of cable 60 is secured by means of a second clevis to pivot arm 62. Idler pulley 64 allows cable 60 to change directions and make connection with the end of pivot arm 62. An upward pull on cable 60 rotates the torque tube so that latch plates 50 and 52 are released from pins 56 and the one to which latch 52 attaches. Release of the pull on cable 60 allows springs 54 to relatch the plates 50 and 52 to pins 56.

FIGS. 4 and 5 show enlarged views of the latch mechanism. The contour of slot 65 made in latch plate 52 (See FIG. 5) is of special configuration. The upper edge (Region A) cuts straight back into the latch plate. Region B curves around in a circular arc to conform to the outer radius of pin 56. Region C is another straight section which forms an acute angle 70 with region A extended. Region D after curving along an initial small arc becomes parallel to the upper edge (Region A).

Pin 56 is comprised of a circular outer shell 66 which is rotatably mounted on inner stud 68. Stud 68 is secured to the main frame of the baler.

When the bale forming operation first commences, the baling chamber will be almost empty. There will be no forces tending to cause the tailgate to open. Latch plate 52 will be positioned as shown in FIG. 4. There will be minimum pull by the cable on crankarm 58. Spring 54 will hold the rear edge of slot 65 against pin 56. The leading edge 72 of latch plate 52 will engage sensor switch 74 which is rotatably mounted on shaft 76.

As the baling chamber becomes full, compressive forces exerted on the bale cause the tailgate to try to open. This causes longitudinal stress in plate 52 in the region between torque tube 46 and pin 56. When the pull on the latch exceeds the tension on spring 54 multiplied by the tangent of the angle 70, the tailgate will begin to open slightly since latch plate 52 is forced to rotate a small amount clockwise as viewed in FIG. 4. The tailgate pressure forces latch plate 52 to rotate a few degrees clockwise, turning against the tension applied by spring 54. As latch plate 52 turns, the tailgate of the baler opens slightly, causing outer shell 66 to roll along region C of slot 65.

The outward pressure exerted by the compressed bale within the chamber continues to force the outer shell 66 of the pin to roll along slot 65 until it reaches region D. There the tangent of the angle (Angle 70 in region C) drops to zero and the latch mechanism holds the tailgate in the slightly ajar position. Meanwhile, the condition of latch plate 50 on the other side of the baler has been following in step with that of latch plate 52.

The clockwise movement of latch plate 52 allows the arm of sensor switch 74 to rotate in a counterclockwise direction. By the time outer shell 66 has traversed region C and stopped at region D of slot 65, shaft 76 of the sensor switch will have moved through angle 78 as shown in FIG. 4. This change is sufficient to trigger a bale ejection sequence.

Typically, the bale ejection sequence may proceed as follows. When sensor switch 74 reaches the tripped position an alert light and/or a buzzer comes on telling the operator that a bale is completed. The operator stops the forward motion of the tractor thus terminating the flow of hay into the baling chamber. In tandem with the turning on of the alert light, the bale typing sequence is begun either manually or automatically. This is completed while compressive forces are still being applied to the bale. On completion of the bale tying event, hydraulic cylinder 42 is actuated to move the upper subframe of the baler from the FIG. 2 to the FIG. 3 configuration.

Actuation of hydraulic cylinder 42 does the following. The movable shaft of hydraulic cylinder 42 is secured by pin means to pivot 62. Offset from this pin means is a second pin mounting means 80 which secures pivot 62 to subframe 40. FIG. 6 shows an enlarged view of pivot 62. There, clevis 82 is depicted as the pin mounting means between shaft 43 of hydraulic cylinder 42 and pivot 62. With hydraulic cylinder 42 attached between subframe 40 and the mainframe of the baler in the manner depicted in FIG. 2, initiation of the piston withdrawing action, first causes pivot 62 to rotate in a clockwise direction as viewed in FIG. 2. Rotation of pivot 62 clockwise causes a pull to be exerted on cable 60 which is secured to the upper end of the pivot by a pin inserted in opening 84 (See FIGS. 2 and 6). A pull on cable 60 exerts through crankarm 58 a rotational torque on torque arm 46 which unlatches latch plates 50 and 52 from pins 56.

With the two latch arms released, the hydraulic cylinder can complete the rotation of subframe 40 about the axle shaft of roller 36. Retraction of piston shaft 43 raises the tailgate to the FIG. 3 condition. A stop 86 on lower left edge of pivot 62 prevents the rotation of the pivot beyond the point where a pull on cable 60 would damage the latch mechanism. With the baler positioned as shown in FIG. 3, the tied bale 38 is ready for ejection out the back of the baler. Subsequent to ejection, the tailgate can be reclosed by extension of shaft 43 of hydraulic cylinder 42. As shaft 43 reaches its openmost position, its length is such that pivot 62 is rotated counterclockwise to a position which allows springs 54 to draw latch plates 50 and 52 into the engaged position depicted in FIGS. 1 and 4. When this tailgate closing event is completed, the alert light will be extinguished signifying to the operator that he can restart the tractor to gather hay for making another bale.

The slot formed in the latch plate must be configured so that the latch members partially disengage in response to a predetermined pressure across the tailgate. FIG. 5 depicts one configuration which was found to be functionally operational. Variations in dimensions can be made within the scope of the invention. As shown in FIG. 5, the upper edge (Region A) is cut straight back into latch plate 52 an amount equal to about one and a half diameters of shell 66 of pin 56. Region B is coextensive with region A, curving downward along an arc of constant radius for some 155±5 degrees, the radius being of the same magnitude as that of shell 66. Region C is then coextensive with region B, continuing in a straight line along a slope which is 180–(155±5) degrees off horizontal. The length of region C is equal to at least one diameter of shell 66. Region D returns to being parallel with region A after undergoing an initial change in direction from the point where regions C and D are coincident. The length of region D is nominally half to two thirds the diameter of shell 66. With these dimensions the latch plates functioned smoothly, with no tendency to prematurely open due to pressures within the baling chamber. Holding after sensor switch 74 trips requires that region D has sufficient length to preclude over-roll of pin 56 beyond the end of the horizontal portion of the slot.

While the invention has been described in conjunction with a baler with large round hay bales, it will be understood that it can be of equal utility in other embodiments. Various changes in the details, materials, steps and arrangement of parts may be made and will occur to those skilled in the art upon a reading of the above disclosure. Therefore, the invention should not be limited to the specific illustration disclosed, but only by the following claims.

We claim:

1. A latching mechanism for use with a baler comprising:
    a bale forming cavity defined by peripheral elements having at least one wall member that can move relative to another when actuated by the pressure of a bale acting on said moveable wall member;
    a pin secured to one of said wall members;
    a latch plate containing a groove which engages said pin to secure the moveable wall members to one another, the latch plate being moveable relative to said pin;
    means for enabling the partial disengagement of said latch plate and said pin in response to a predetermined pressure of the bale on said moveable wall member;
    means for preventing the total disengagement of said latch plate and pin following said partial disengagement;
    means responsive to the partial disengagement of said latch plate and pin for sensing and signaling that said predetermined pressure has been reached; and
    means for totally disengaging said latch plate and pin for disconnecting said two members from each other.

2. A latching mechanism as defined in claim 1 wherein said latch plate includes a transverse slot which engages said pin and having an edge of said slot in contact with said pin which is defined by first and second angularly displaced surface regions, the first surface region serving to generate a torque for rotating said latch plate relative to said pin for partially disengaging said latch plate and pin and the second surface region being oriented relative to said first surface for eliminating said torque thereby maintaining the latch plate in contact with said pin to prevent further relative motion between said one wall member and said another wall member.

3. The invention as defined in claim 1 wherein the pin includes an outer shell rotatably mounted on an inner stud which is fixedly secured to a non-moveable peripheral wall member.

4. A latching mechanism for use with a baler of the type wherein there is a wheel mounted cage-like frame generally surrounding a baling chamber of fixed size and closed ends, the baling chamber being divided into two portions with one portion being hinge mounted along one edge to allow the second edge to swing open as a gate through which a completed bale is discharged, the gate being maintained in a closed position during the remainder of the bale forming operation, opening and closing of the gate being accomplished by means of a hydraulic cylinder, said latching mechanism comprising:

a torsional member rotatably mounted on that portion of the baling chamber which opens as a gate and adjacent the second edge thereof;

pin means secured to and extending outwardly from the frame of said baler, said pin means being positioned adjacent the second edge of that portion of the baling chamber which opens as a gate;

at least one latch plate secured at its one end to said torsional member and extending perpendicularly therefrom, each latch plate being sized and positioned to engage one of said pin means at a transverse slot made near the second end of said latch plate, the contour of said slot being such that relative motion between said latch plate and said pin means results from the pressure on said gate due to the application of compressive forces on the bale being formed within said chamber;

spring means attached to said latch plate and causing any relative motion between said latch plate and said pin means to be proportional to the compressive forces within said baling chamber; and sensor switch means responsive to movement of said latch plate relative to said pin means for initiating the bale discharge sequence.

5. The invention as defined in claim 4 wherein two latch plates are used, one on each end of said torsional member.

6. The invention as defined in claim 5 and including a crankarm attached at its one end to said torsional member, the crankarm extending perpendicularly from said torsional member and having at its second end a cable attached thereto, the second end of the cable being secured to a pivot which is actuated by said cylinder to complete the release of said latch plates from said pin means to enable opening of said gate.

7. The invention as defined in claim 4 wherein the spring means comprises a coil spring for each latch plate with each spring having its one end secured to said latch plate and its second end attached to said frame in an orientation which holds said pin means within the slot of said latch plate.

8. The invention as defined in claim 4 wherein the contour of the transverse slot in each latch plate includes a first region extending in at right angles from the edge of the latch plate a distance equal to 1.5 pin diameters, coextensive with the first region is a second region which curves downward 155±5 degrees along an arc of constant radius, the radius being of the same magnitude as the periphery of the pin means, then coextensive with said second region is a third having a straight portion of a length equal to at least one diameter of said pin means and a slope that is 180-(155±5) degrees off horizontal, the third region being followed by a fourth whose slope returns to being parallel with said first region after an initial change in slope from the point where the third and fourth regions join.

* * * * *

UNITED STATES PATENT AND TRADEMARK OFFICE
CERTIFICATE OF CORRECTION

PATENT NO. : 4,389,929
DATED : June 28, 1983
INVENTOR(S) : Leroy Kluver and John Arnold It is certified that error appears in the above–identified patent and that said Letters Patent are hereby corrected as shown below:

Column 1, line 20, please change "paling" to --baling--

Column 1, line 52, please change "similar" to --smaller--

Column 1, line 53, please change "window" to --windrow--

Column 2, lines 23 and 24, please change "window" to --windrow--

Column 5, line 22, please change "typing" to --tying--

Signed and Sealed this

Twenty-third Day of August 1983

[SEAL]

Attest:

GERALD J. MOSSINGHOFF

Attesting Officer   Commissioner of Patents and Trademarks